(12) United States Patent
Montuno et al.

(10) Patent No.: US 7,528,776 B2
(45) Date of Patent: May 5, 2009

(54) BEACON-ASSISTED PRECISION LOCATION OF UNTETHERED CLIENT IN PACKET NETWORKS

(75) Inventors: Delfin Y. Montuno, Kanata (CA); James Aweya, Kanata (CA); Michel Ouellette, Orleans (CA); Kent Felske, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 104 days.

(21) Appl. No.: 11/689,660

(22) Filed: Mar. 22, 2007

(65) Prior Publication Data

US 2008/0231511 A1    Sep. 25, 2008

(51) Int. Cl.
G01S 3/02 (2006.01)
(52) U.S. Cl. .................... 342/458; 342/465
(58) Field of Classification Search ........... 342/458, 342/465
See application file for complete search history.

(56) References Cited

U.S. PATENT DOCUMENTS 6,574,478 B1 * 6/2003 Mortensen .............. 455/456.5
7,009,561 B2 * 3/2006 Menache et al. ............ 342/463

FOREIGN PATENT DOCUMENTS

GB    2330716 A  *  4/1999

OTHER PUBLICATIONS

Schau et al, "Passive Source Localization Employing Intersecting Spherical Surfaces from Time of Arrival Differences," IEEE Trans. on Acoustics, Speech, and Signal Processing, vol. ASSP-35, No. 8, Aug. 1987, pp. 1223-1225.*

(Continued)

Primary Examiner—Gregory C Issing
(74) Attorney, Agent, or Firm—Anderson Gorecki & Manaras LLP

(57) ABSTRACT

A novel beacon-based position location technique for efficient location discovery of untethered clients in packet networks is disclosed. The position location technique utilizes the time-difference-of-arrival ("TDOA") of a first signal transmitted by a beacon of known location and a second signal transmitted by an untethered client. The TDOA of these two signals is measured locally by at least three non-collinear signal receivers. For each of the receivers, the TDOA is used to calculate a perceived distance to the client. A circle is then calculated for each receiver, centered on the receiver and having a radius equal to the perceived distance. At least two lines defined by points of intersection of the calculated circles are then calculated. The point of intersection of the lines represents the location of the client. To facilitate operation, the signal receivers may be arranged on vertices which define a convex polygon as viewed from above. The location system requires no time (time-of-day) synchronization of the signal receivers, and only the coarse frequency synchronization, on the order of, tens of parts-per-million (ppm). The technique even works for the case where the signal receivers are run asynchronously, provided the frequency accuracies of the signal receivers are on the order of about 50 ppm or better. The technique introduces no communication overhead for the beacon, client and signal receivers. Further, the computation overhead at the signal receivers is relatively low because the location detection algorithm involves only simple algebraic operations over scalar values.

14 Claims, 17 Drawing Sheets

OTHER PUBLICATIONS

Mellen et al, "Closed-Form Solution for Determining Emitter Location Using Time Difference of Arrival Measurements," IEEE Trans. on Aerospace and Electronic Systems, vol. 39, No. 3, Jul. 2003, pp. 1056-1058.*

Smith, Julius O. et al, "Closed-Form Least Squares Source Location Estimation from Range-Difference Measurements," IEEE Trans. on Acoustics, Speech and Signal Processing, vol. Assp-35, No. 12, Dec. 1987, pp. 1661-1669.*

* cited by examiner

Beacon Signal leads Client Signal – Beacon Signal Arrives First

BEACON-ASSISTED PRECISION LOCATION OF UNTETHERED CLIENT IN PACKET NETWORKS

FIELD OF THE INVENTION

This invention is generally related to the field of network communications, and more particularly to utilizing a beacon to identify client location in a network.

BACKGROUND OF THE INVENTION

Position location systems are used to provide location identification support for location-sensitive services and applications. Examples of location-sensitive services and applications include asset management, service personnel tracking, delivery vehicle tracking, and package or shipment tracking. In the case of critical asset tracking, organizations such as defense contractors have a need to track parts and equipment of a sensitive, secure, and hazardous nature, such that movements are recorded to provide some indication of who has had access to them, and as proof that they have not been tampered with or viewed by unauthorized personnel. Other examples of location-sensitive services and applications include roadside assistance, boundary maintenance, driving directions, caller location tracking, and fixed asset location monitoring. Vehicle location tracking may be used to enable dispatchers to monitor delivery vehicle location without driver intervention. Public safety services like the provision of 112 and 911 services also have a need for location tracking. Phase I of the US Federal Communications Commission's ("FCC") E911 rules requires that wireless operators provide to Public Safety Answering Points ("PSAP") with the mobile number of each wireless 911 call, allowing the PSAP dispatcher to attempt to call back to the mobile device if the call is disconnected or to obtain additional information. Phase I also requires mobile device operators to provide to PSAPs the location of the cell site that handled the origination of each 911 call. Both the call-back number and the cell site location are to be transmitted by the mobile device so that they arrive at the PSAP at approximately the same time as the call. Phase II of the FCC's wireless E911 rules requires mobile devices to provide to PSAPs the calling number and the caller's physical location within an average distance tolerance of about 100 meters. Other uses for location tracking include security applications where authorities may want to be able to track the locations of probationers, child locators where parents want to be able to track the whereabouts of their children, and general service locators where mobile consumers may want to be able to determine "Where is the nearest ABM to where I am currently located?" or "How far away is the nearest MacDonald's Restaurant?" or "What are the traffic conditions in my vicinity?" Location may also be useful in wireless sensor networks which require sensor nodes to know their physical locations, such as target detection and tracking, precision navigation and, search and rescue, geographic routing, and security surveillance. Further, knowledge of sensor location can be used to facilitate network functions such as packet routing, and collaborative signal processing. Sensor position can also serve as a unique node identifier, making it unnecessary for each sensor to have a unique ID assigned prior to its deployment.

Driven by the demand for location detection and tracking systems, many techniques have been proposed in recent years. Perhaps the most popular location detection techniques include received-signal-strength-indicator ("RSSI"), angle-of-arrival ("AOA"), time-of-arrival ("TOA"), and time-difference-of-arrival ("TDOA"). Many of these techniques operate in two phases: a range or angle measurement phase, and position calculation phase where the measurements are transformed into a position estimate. Some techniques perform a pre-processing and/or refinement phase before/after generating and initial estimate. However, each of these techniques has drawbacks. The angle of arrival and received signal strength, for example, provide only a relatively coarse indication of angle and proximity, and can be affected by extraneous factors such as reflections and attenuation by intervening objects. Time of arrival is sometimes impractical because it requires precise time synchronization of all involved fixed and mobile devices. Further, the accuracy of the location calculation is a function of the accuracy of the time synchronization. In the case of round trip time of flight, only the measuring devices require precise time synchronization. However, the measuring devices require precise delay/processing time data for each response. Time-difference-of-arrival requires only the precise time synchronization of the measurement devices. However, the locations of the measuring devices must be known with precision for forming and solving elliptical equations.

DETAILED DESCRIPTION

Figure 1:
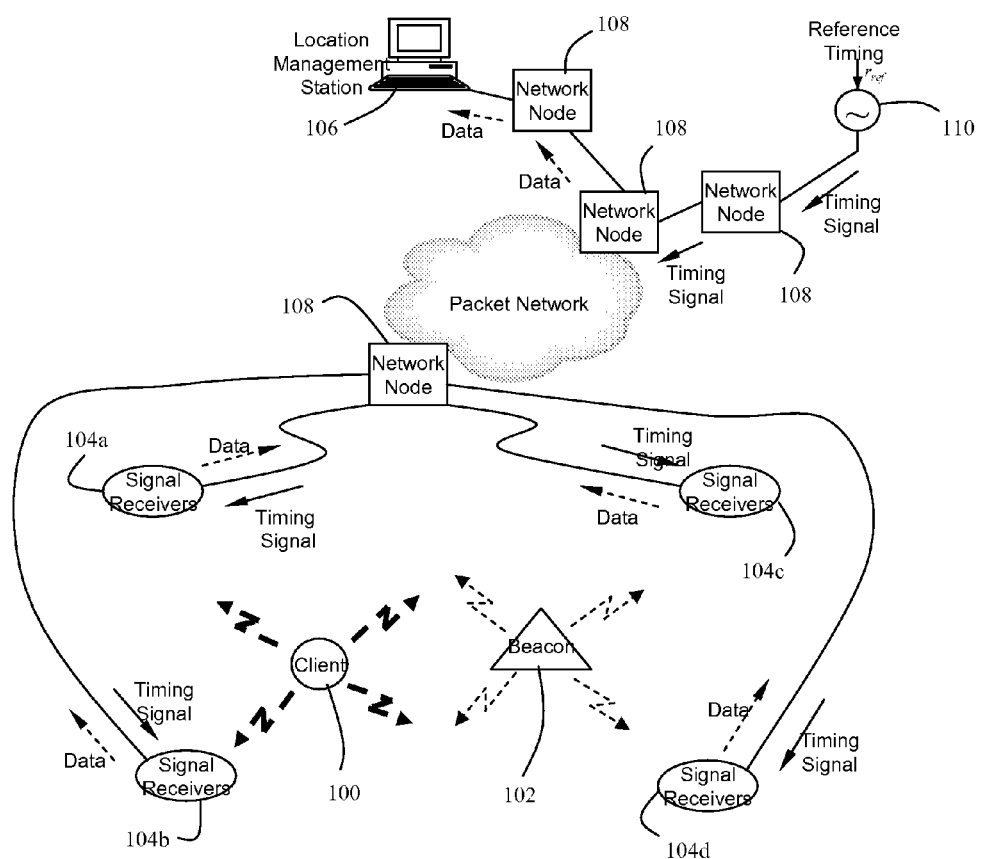
FIG. 1 illustrates an embodiment of location system architecture.

FIG. 1 illustrates a packet network architecture adapted for determining the location of an untethered client (100) that sends periodic, distinguishable signals. A beacon device (102) sends periodic distinguishable signals that are used in conjunction with the client signals. There are at least three signal receivers (104a, 104b, 104c, 104d) that receive the signals from the client (100) and the beacon (102). The signal receivers are in communication with a location management station (106) via network nodes (108) associated with a packet network. A reference clock (110) may also be utilized.

The relative locations of the beacon device (102) and signal receivers (104a-104d) are established before operation. In other words, the distance and direction of the beacon device relative to each signal receiver is known a priori. The location information may be entered and maintained at a management station (106) by a network engineer. It should also be noted that the signal receivers are not collinearly arranged. In one embodiment the signal receivers are arranged at positions which define the vertices of a convex polygon.

The location management station (106) is used to configure and control the system. The station is operable to retrieve measurement data from the network, from mobile devices, and from location measurement units. In particular, all measurements in the location system are sent to the location management station for further processing and analysis. The station is also operable to calculate mobile device locations from the measurement data. In other words, using measurements from location measurement units and other network data, the location management station calculates the position of target mobile devices. The station is also operable to administer and control the location system. For example, in the mobile networking case, the location management station sends the location of the mobile device in terms of latitude and longitude calculations through the base station controller ("BSC") and mobile switching center ("MSC") to gateway mobile location centers for distribution to applications/servers for location-based mobile services. The station also manages communications between the location system and external entities such as gateway mobile location centers and network operations centers. In addition to calculating mobile device location, the management station manages, coordinates, and administers the location system and provides interfaces to external entities such as network operations and administration centers/systems. In one application of the location system, a location activity is initiated by an application external to the location system itself. For example, a gateway mobile location center, in response to an application's request for a location (for example, to find a child), screens the request and forwards it through the network to the location management station. Similarly, at the end of the location process, the location management station will typically send calculated mobile location information through a gateway mobile location center to an external entity, generally the application that initiated the location activity or, in the case of public safety locations, to the appropriate emergency service center/public safety answering point.

Figure 2:
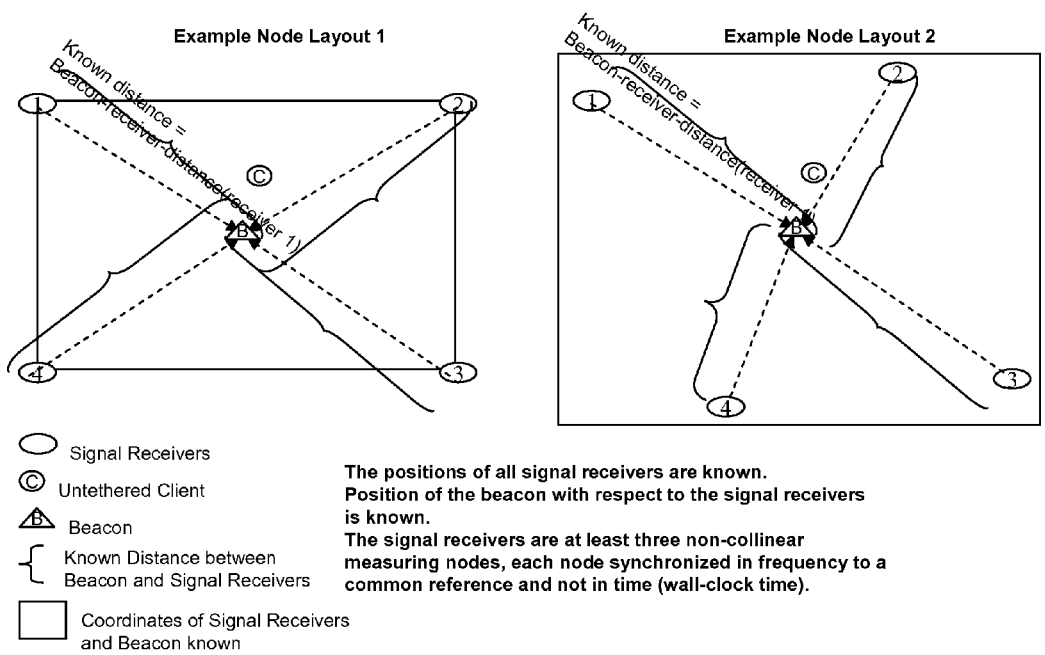
FIG. 2 illustrates sample node layout diagrams for signal receivers and beacon device.
Figure 3:
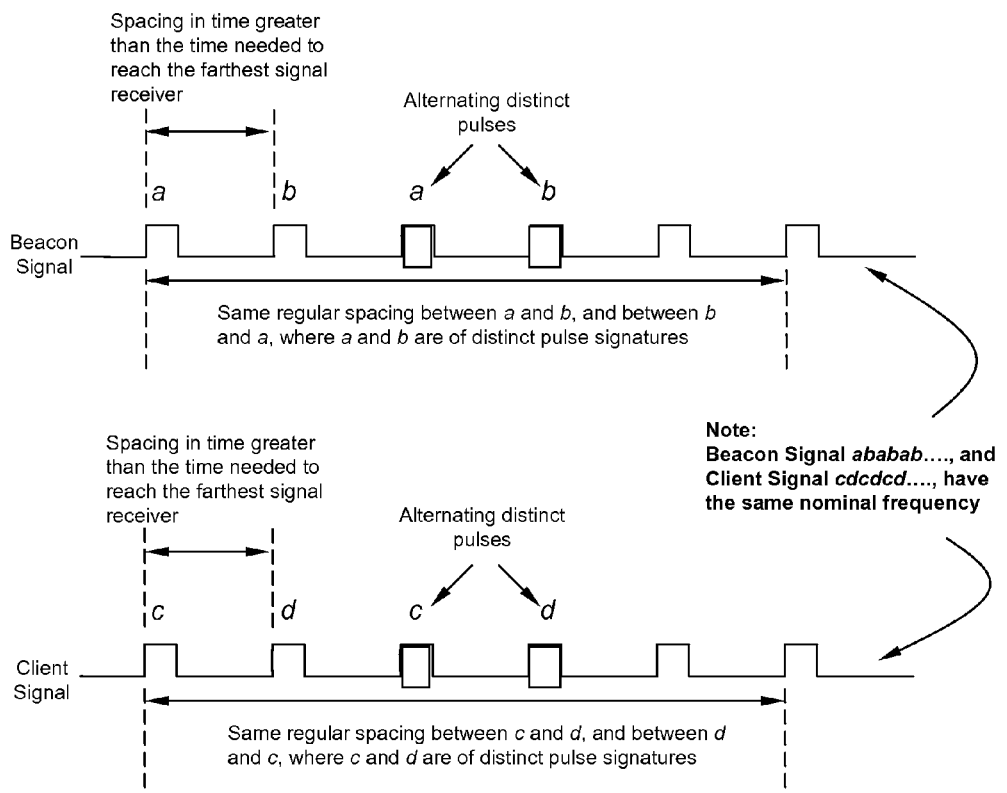
FIG. 3 illustrates beacon and untethered client signals.

Referring now to FIGS. 1 through 3, the untethered client (100) transmits periodic distinguishable signals at a nominal frequency $f_{nom}$. When there is more than one client, the clients are distinguished by their respective unique pulse signatures. The beacon device (102) transmits periodic distinguishable signals at a nominal frequency $f_{nom}$. The signal receivers (104a-104d) are operable to detect the periodic distinguishable signals from the client and the beacon device. Preferably, the signal receivers are frequency synchronized to a common clock (110) with frequency, $f_{ref}$, and each signal receiver synthesizes a very high speed sampling clock with frequency $f_{os}$ from this common clock. Note that only frequency synchronization is preferred at the signal receivers and not time synchronization, i.e., wall-clock transfer. Without frequency synchronization, independently running clocks at the receivers can be used, provided the clocks have the same nominal frequency and their frequency derivations are well constrained. Alternatively, the signal receivers could be run asynchronously but with each receiver having the same nominal frequency and well constrained deviation from nominal, e.g., on the order of some parts-per-million ("ppm"). The maximum deviation in this case will affect the accuracy of the location system. Further, a frequency deviation will result in a client location being defined by a cluster of points instead of a single point, as will be the case when all receiver frequencies are tightly synchronized.

Each of the signal receivers reference the same beacon and client pulse instances to calculate a time difference of arrival ("TDOA") between the beacon signal and the client signal. The TDOA is then used to generate a distance difference (or phase distance) between the beacon location and the client location. Each signal receiver then forwards its distance difference measurement for a particular client to the location management station, which executes an algorithm to determine the actual location of the client. Each signal receivers employs a phase detector to determine the TDOA between the beacon signal and the client signal.

Figure 4:
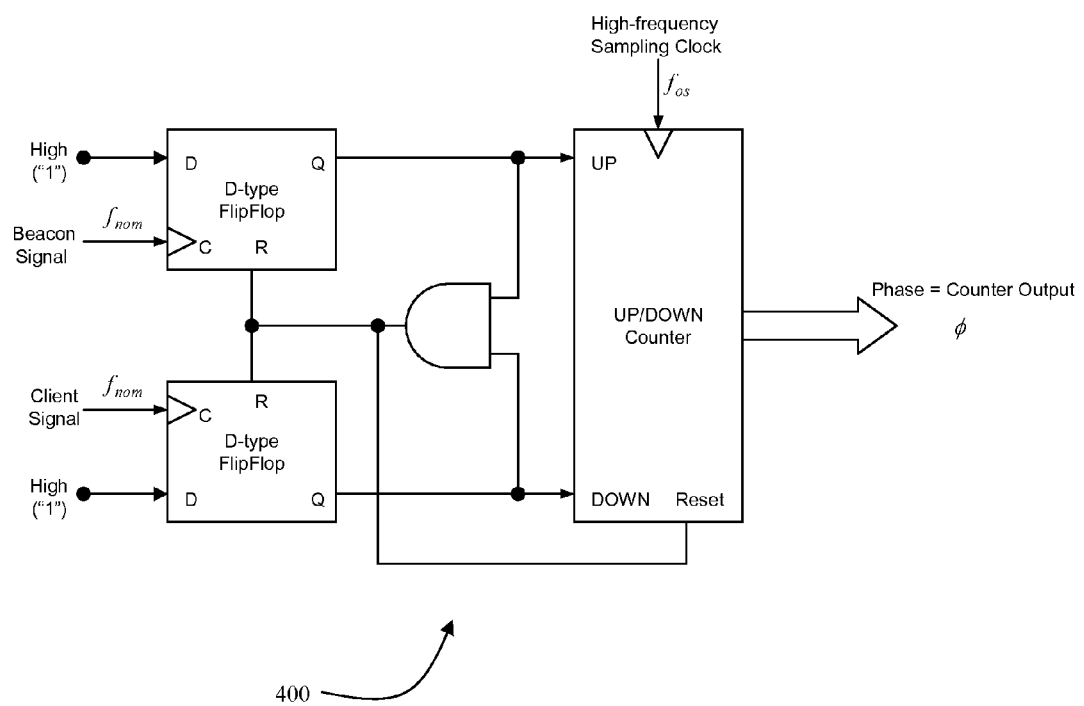
FIG. 4 illustrates exemplary beacon and client signal phase detector architecture at the signal receivers.

FIG. 4 illustrates one embodiment of the phase detector (400). A digital beacon-client signal phase detector ("PD") circuit can be implemented using either D-type master-slave flip-flops or R-S latches. The illustrated example shows a PD built with D-type flip-flops. The outputs UP and DOWN will respond only to the positive-going edges of the inputs "Beacon Signal" and "Client Signal." Therefore, the input duty cycles do not have any effect on the outputs.

Figure 5:
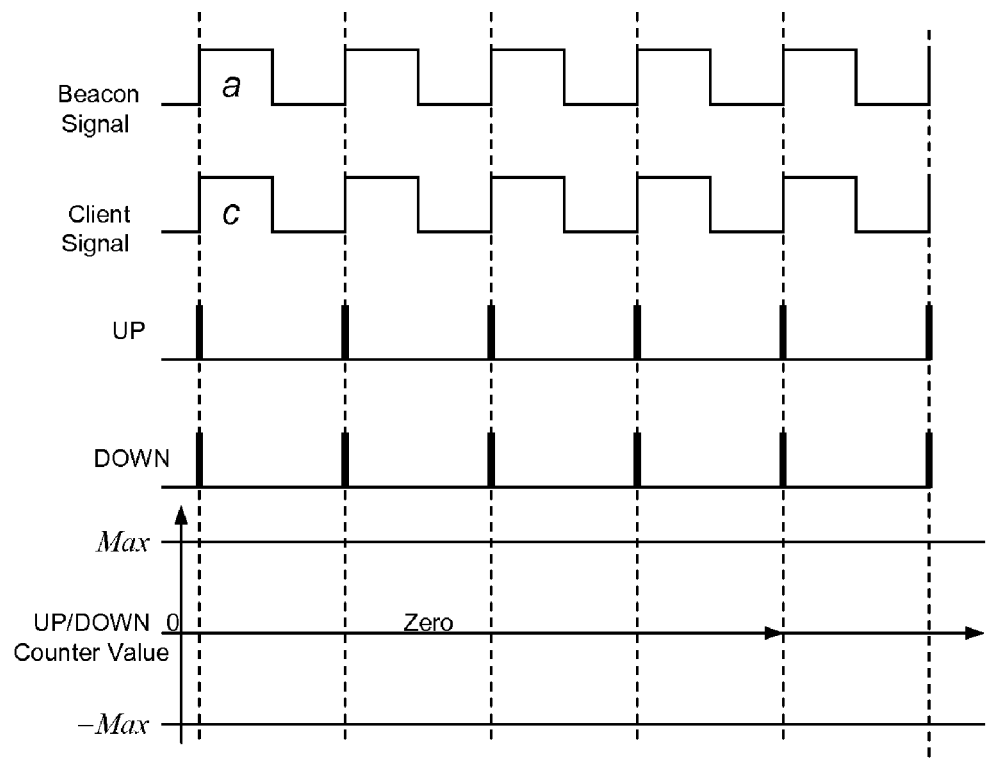
FIG. 5 illustrates phase detector operation where there is no phase difference, i.e., the beacon and client signals arrive at the same time.
Figure 6:
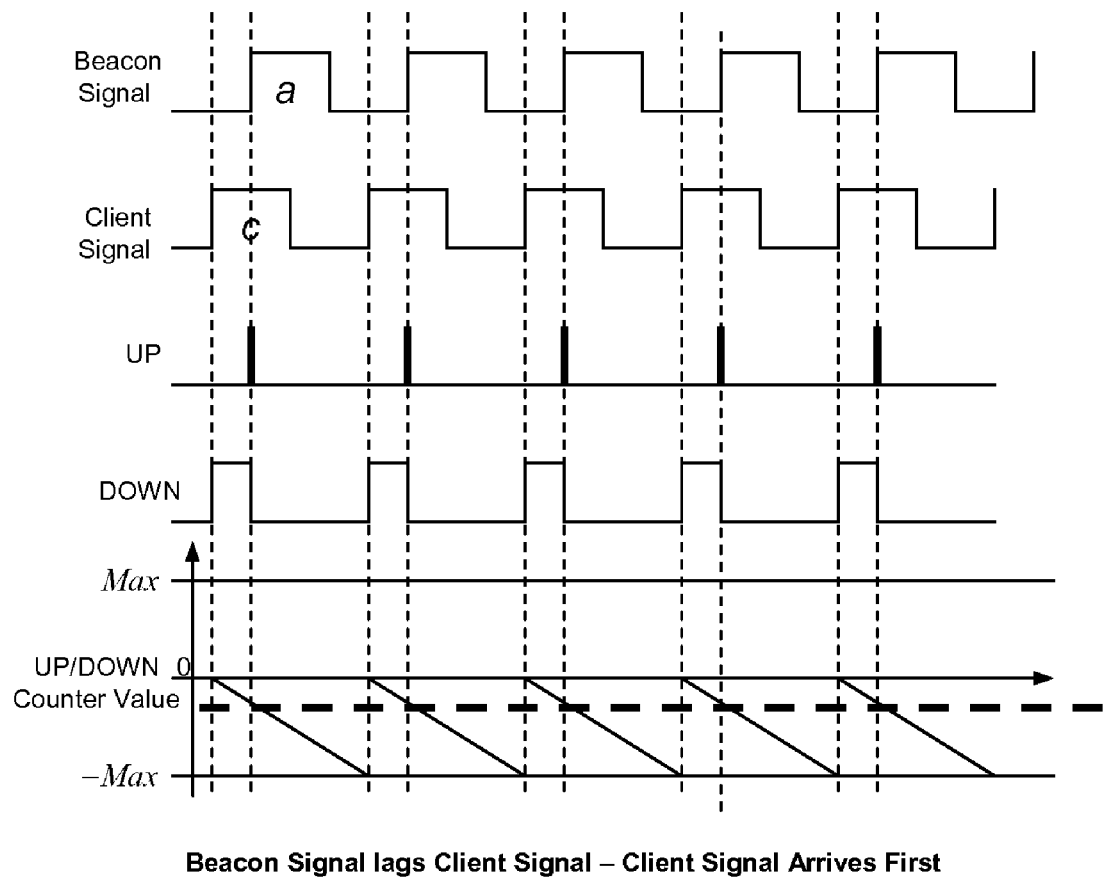
FIG. 6 illustrates phase detector operation where the beacon signal lags the client signal, i.e., the client signal arrives first.
Figure 7:
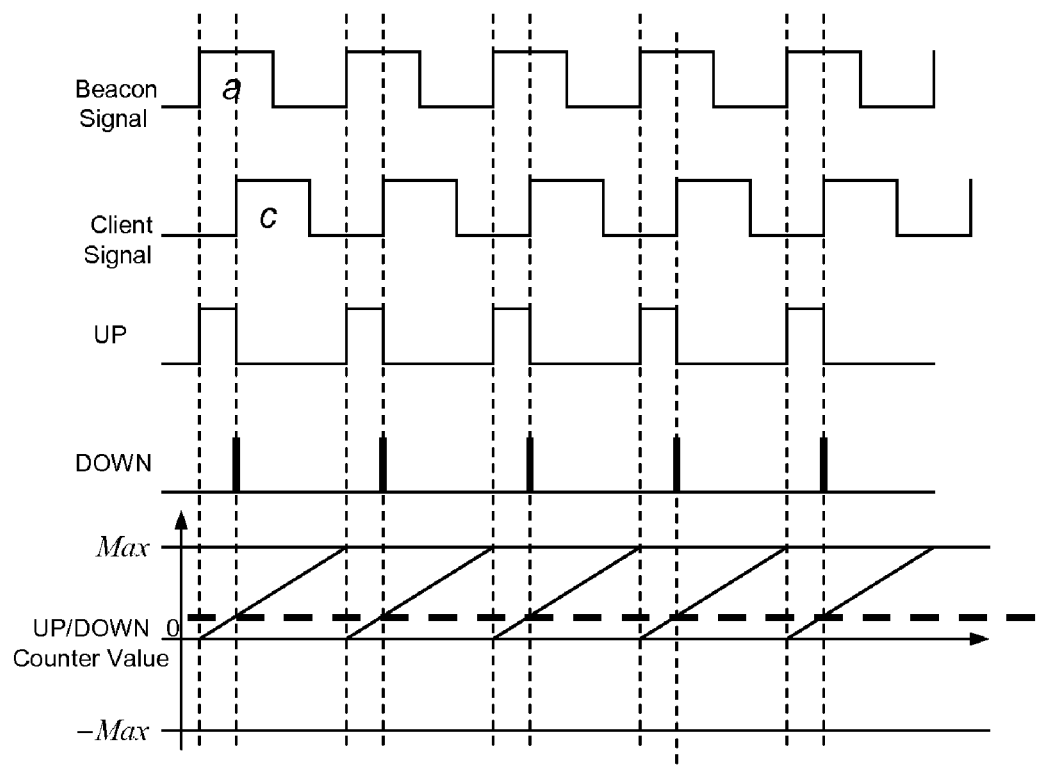
FIG. 7 illustrates phase detector operation where the beacon signal leads the client signal, i.e., the beacon signal arrives first.

Operation of the PD is illustrated in FIGS. 5 through 7. The time average value of the differential output, $(UP-DOWN)_{AVE}$, measured by the high-speed counter is an indication of phase difference between the beacon signal and client signal. The frequency of the high-speed sampling oscillator $f_{os}$ driving the UP/DOWN counter is chosen such that the location system will have good precision. Given that c is the speed of light in meters per second (299,792,458 meters per second), the distance traveled in $1/f_{os}$ seconds is $c/f_{os}$ meters, which is also the precision of the location system. The beacon signal period is quantized (by the high-speed clock with frequency $f_{os}=1/\tau_{os}$) into Max steps, i.e., $Max=\tau_{nom}/\tau_{os}$. Further, the maximum value of the PD counter is higher than Max, and the UP-DOWN counter is a binary counter of certain size whose upper limit can be denoted as Max. The value stored in the counter is latched out by the active rising edge of the beacon signal.

Referring specifically to FIG. 4, in the case where there is a phase difference between the beacon and client signals, depending on which signal starts first, the PD generates pulses at either UP or DOWN with a width equal to the phase difference between the two inputs. Since the two frequencies are nominally equal, one of the outputs has a duty cycle that is a function of the difference between the input transition times while the other output remains inactive or low. Note that UP and DOWN are never high simultaneously. Thus, the time average value of the differential output, $(UP-DOWN)_{AVE}$, is an indication of phase difference between the two signals.

In the case where the PD is in the {UP=0 and DOWN=0} state initially, and there is zero phase error between the beacon signal and the client signal at a signal receiver as shown in FIG. 5, then the two signals are exactly in phase, i.e., both positive edge of beacon and client signals occur at the same time, and hence their effects cancel. The PD will thus remain in the state {UP=0 and DOWN=0} indefinitely, and the UP/DOWN counter outputs a constant stream of zeros. When beacon signal lags the client signal at a signal receiver as shown in FIG. 6, the PD toggles between the states {UP=0, DOWN=0} and {UP=0, DOWN=1}, and the UP/DOWN counter also outputs a constant nonzero value with time. In this case the PD outputs a negative value implying the beacon lags the client signals at the signal receiver. When beacon signal leads the client signal at a signal receiver as shown in FIG. 7, the PD toggles between the states {UP=0, DOWN=0} and {UP=1, DOWN=0}, and the UP/DOWN counter also outputs a constant nonzero value with time. In this case the PD outputs a positive value implying the beacon leads the client signals at the signal receiver.

Figure 8:
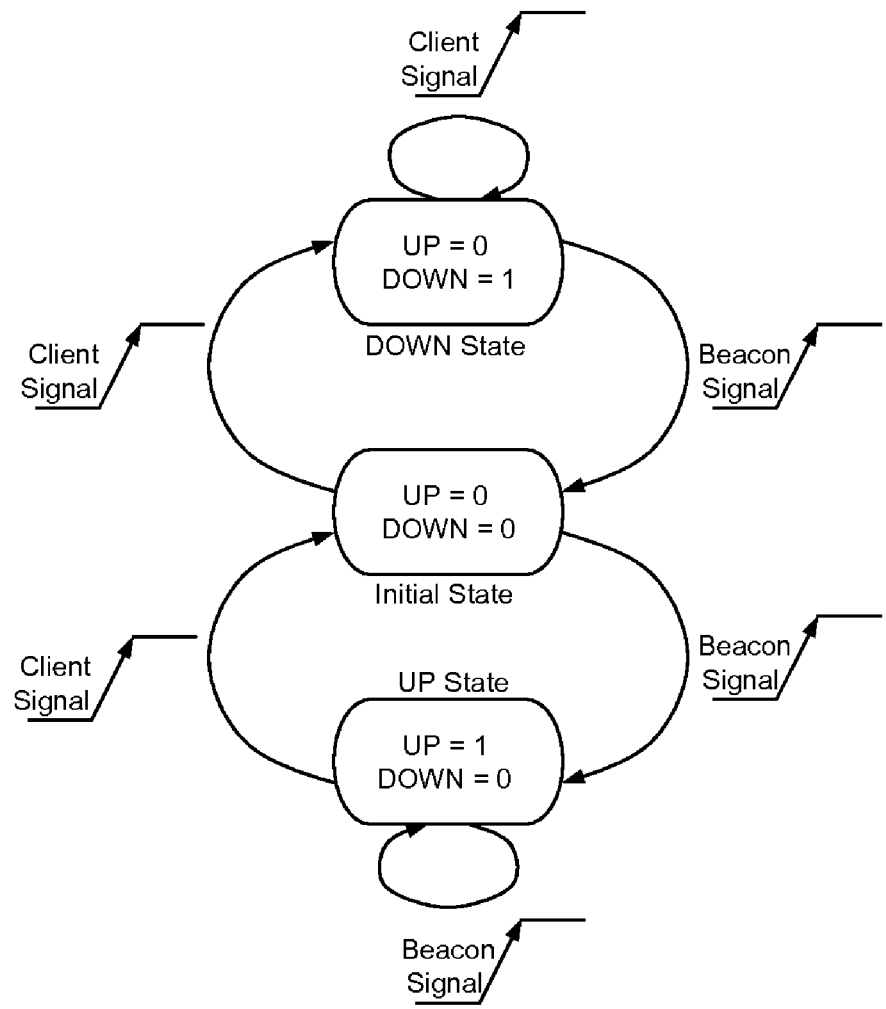
FIG. 8 illustrates a phase detector state diagram.

FIG. 8 illustrates a state diagram of the PD. The PD can be in one of three states: {UP=0, DOWN=0}; {UP=1, DOWN=0}; and {UP=0, DOWN=1}. A fourth state {UP=1, DOWN=1} is inhibited by the addition of the AND gate. Whenever both flip-flops are in the 1 (high) state, a logic "high" level appears at their R ("reset") inputs which resets both flip-flops. Consequently the PD acts as a tri-state comparator ("triflop"). In the illustrated example, the D-type flip-flops are triggered by the positive-going edges of inputs, beacon signal and client signal, to the PD. Initially, both outputs are low. When one of the PD inputs rises, the corresponding output becomes high. The state of the finite-state machine ("FSM") moves from an initial state to an UP or DOWN state. The state is held until the second input goes high, which in turn resets the circuit and returns the FSM to the initial state.

Depending on the phase/frequency difference between the beacon signal and the client signal, the slope of the PD counter output may be positive or negative and the slope basically stays the same until the next reset. To interface with the location management station software, the PD is implemented as follows. First, before the counter is reset at signal receiver i, the PD latches out the counter value, $\pm C_i$, (may be zero, positive, or negative value). Next, $\pm C_i$ is passed to the location management station for processing. Next, at the location management station, this value $\pm C_i$ is converted to a phase distance in meters delta (receiver i) by using the following expression:

$$\text{delta(receiver } i) = \pm \frac{C_i \cdot c}{f_{os}}$$

meters, where c is the speed of light in meters per second.

Phase detector sampling frequency may have an impact on location precision. In general, the frequency magnitude $f_{os}$ of the high-speed sampling oscillator determines the location resolution, i.e., the granularity of location measurement, and the frequency stability determines the location accuracy, i.e., the variation in location resolution. From the speed of light formula, $c=f_{os}\lambda$, we have $\lambda=c/f_{os}$ which yields the relationship of the location resolution given a frequency value. The location inaccuracy due to a frequency deviation of ±ppm is given by $$LA = \frac{c}{f_{os}} - \frac{c}{f_{os}(1 \pm ppm)} = \lambda\left[1 - \frac{1}{(1 \pm ppm)}\right]$$

meters. Table 1 shows a sample range of location resolution for the frequency range of 50 MHz to 500 MHz with ±50 ppm.

Figure 9:
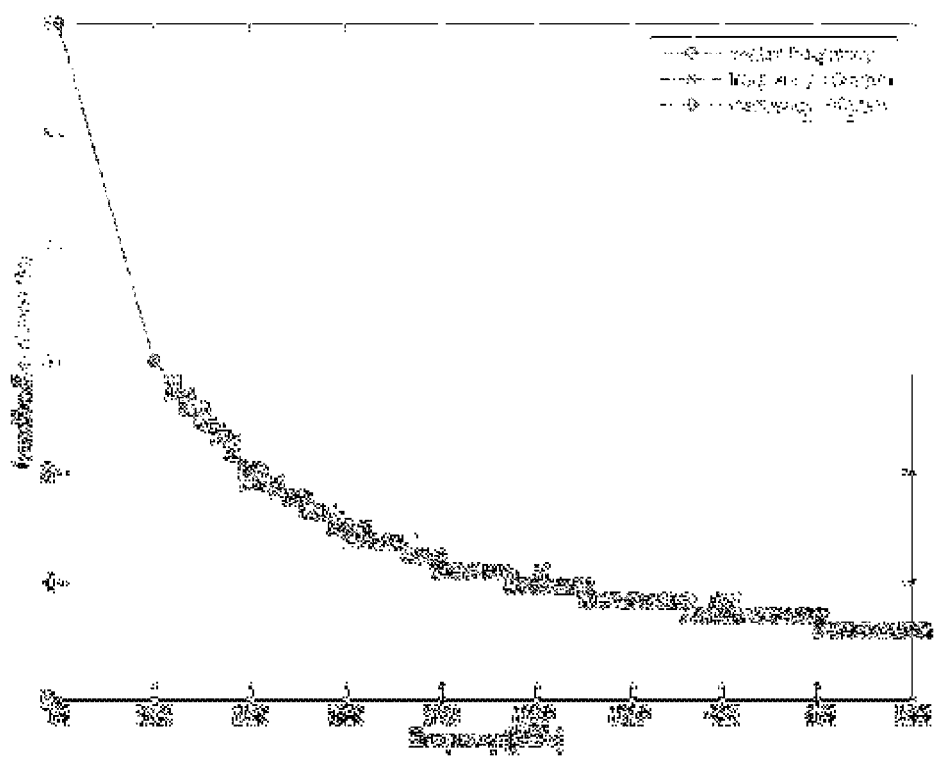
FIG. 9 illustrates location resolution versus frequency with different accuracies.

The corresponding graph in FIG. 9 shows that location resolution is more sensitive to choice of frequency magnitude than location accuracy is to the choice of frequency stability.

TABLE 1

| Frequency of High-Speed Oscillator $f_{os}$ (MHz) | Corresponding Location Resolution $\lambda = c/f_{os}$ (meter) | Location Accuracy $LA = \lambda[1 - 1/(1 \pm ppm)]$ (μm) | |
|---|---|---|---|
| | 0 ppm | +50 ppm | −50 ppm |
| 50  | 5.9958  | 299.77747 | −299.80745 |
| 100 | 2.9979  | 149.88873 | −149.90372 |
| 150 | 1.9986  | 99.925823 | −99.935816 |
| 200 | 1.499   | 74.944367 | −74.951862 |
| 250 | 1.1992  | 59.955494 | −59.96149  |
| 300 | 0.99931 | 49.962912 | −49.967908 |
| 350 | 0.85655 | 42.825353 | −42.829635 |
| 400 | 0.74948 | 37.472184 | −37.475931 |
| 450 | 0.66621 | 33.308608 | −33.311939 |
| 500 | 0.59958 | 29.977747 | −29.980745 |

A location algorithm executed by the management station uses the signals generated at the beacon and the client. Each pair of these two signals, one from beacon and the other from the client, serves as time markers for all the receivers. The location resolution and accuracy of the algorithm, however, do not depend on the stability and the magnitude, i.e., nominal value, of the frequency used at the beacon and the client. The algorithm does require that these signals be distinguishable by the receivers and their periods not be ambiguous. The algorithm also uses the measurement at each receiver of the separation of the two time markers described above. In this case, the choice of the frequency source used to make the measurement influences the granularity and the variation of the location resolution.

Figure 10:
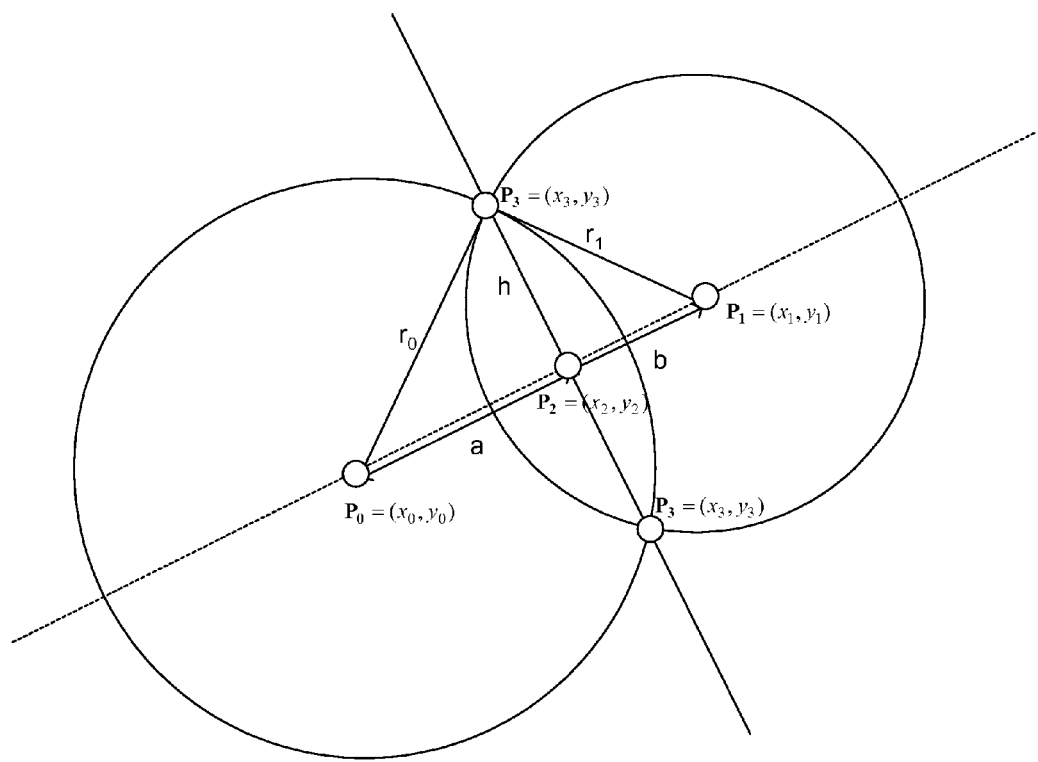
FIG. 10 illustrates the line defined by two intersecting circles.

Background mathematics for the algorithm will now be described for completeness. Two important concepts used in the algorithm are the line formed by two intersecting circles and the intersection of two lines. The points of intersection of two circles are utilized to help establish the location of the untethered client. The line joining these two points can then be used to accurately locate the client. If two circles do actually intersect, then the two points of intersection are be denoted as $P_3=(x_3, y_3)$, as shown in FIG. 10. $P_0=(x_0, y_0)$ is the center of circle $C_0$ with radius $r_0$ and $P_1=(x_1, y_1)$ is the center of circle $C_1$ with radius $r_1$. From the two triangles $P_0P_2P_3$ and $P_1P_2P_3$ in FIG. 10, it is possible to derive the following expressions:

$$a^2 + h^2 = r_0^2$$
$$b^2 + h^2 = r_1^2.$$

Noting from FIG. 10 that d=a+b, we can solve for a as follows:

$$a = \frac{(r_0^2 - r_1^2 + d^2)}{2d},$$

from which we see that $a=r_0$, that is, a reduces to $r_0$ when the two circles touch at one point, i.e., $d=r_0+r_1$. Alternatively, knowing the points $P_0=(x_0, y_0)$ and $P_1=(x_1, y_1)$, we obtain d simply as $d=\sqrt{(x_1-x_0)^2+(y_1-y_0)^2}$. Substituting a into the first equation, we solve for h as $h=\sqrt{r_0^2-a^2}=\sqrt{(r_0+a)(r_0-a)}$.

However, we see from FIG. 10 that $$P_2 = P_0 + \frac{a(P_1 - P_0)}{d},$$

from which we get the two intersection points of two non-concentric circles as:

$$x_3 = x_2 \pm \frac{h(y_1 - y_0)}{d}$$
$$y_3 = y_2 \mp \frac{h(x_1 - x_0)}{d},$$

can also be expressed as:

$$x_{31} = x_2 + \frac{h(y_1 - y_0)}{d} \quad x_{32} = x_2 - \frac{h(y_1 - y_0)}{d}$$
$$y_{31} = y_2 - \frac{h(x_1 - x_0)}{d} \text{ and } y_{32} = y_2 + \frac{h(x_1 - x_0)}{d}.$$

From the above results, it is possible to make some helpful observations. For two circles, $C_0$ with center at $P_0=(x_0, y_0)$ and radius of $r_0$, and $C_1$ with center at $P_1=(x_1, y_1)$ and radius of $r_1$, if $r_0+r_1<d$, then the circles are separate, resulting in no intersection; if $r_0+r_1 \geq d = \sqrt{(x_0-x_1)^2+(y_0-y_1)^2}$, then the circles intersect, including complete containment; and if $|r_0-r_1|>d$, then one circle is contained within the other, also resulting in no intersection. In the location system algorithm executed at the management station, the second condition above is utilized to check for a feasible solution any time the algorithm is executed. Since the intersection of loci of location estimates provides an accurate pin-pointing of the client device, the algorithm incorporates a mechanism to guarantee that the non-intersecting circles (loci) always intersect, provided the client is within the area of interest. With this mechanism, the radius of each circle found to satisfy the first condition can be increased by a value greater than $\Delta r=[d-(r_1+r_0)]/2$ and less than $\Delta r=\{[d-(r_1+r_0)]+\min(r_0,r_1)\}/2$ to cause them to intersect.

Figure 11:
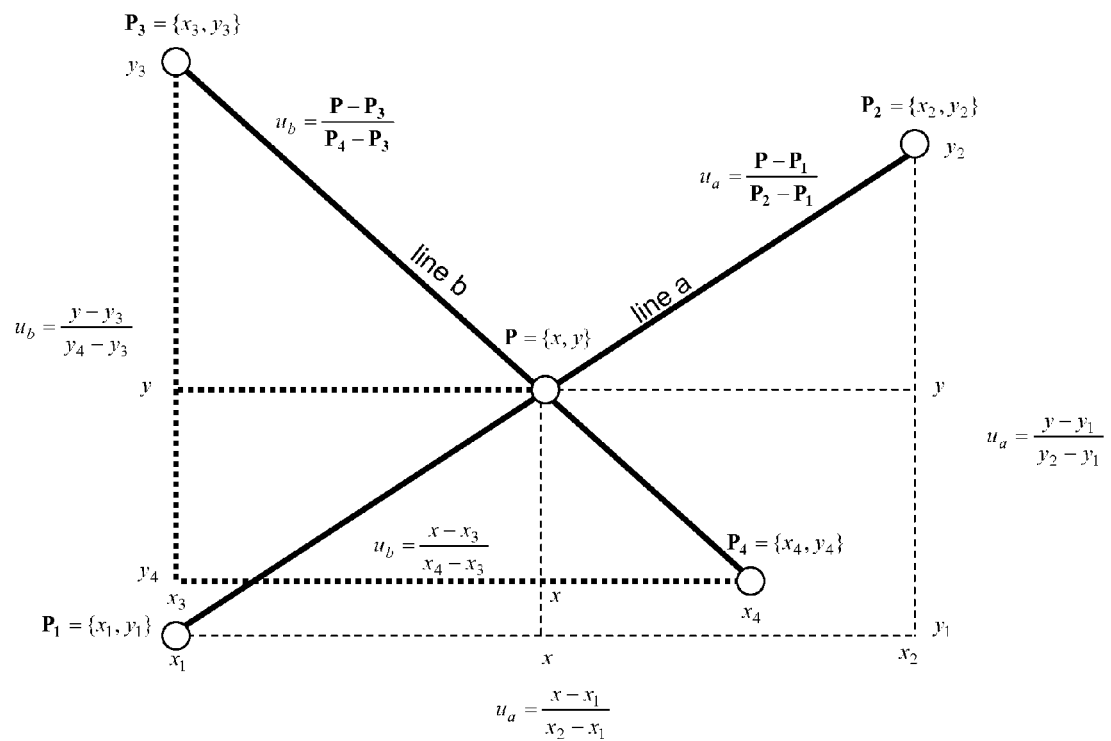
FIG. 11 illustrates the intersection of the two lines.

Referring to FIG. 11, the intersection of two lines is used in the location system to pin-point the location of the untethered client. Using ratios, equations representative of lines a and b, respectively, can be expressed as:

$$P_a = P_1 + u_a(P_2 - P_1)$$
$$P_b = P_3 + u_b(P_4 - P_3).$$

By setting $P_a=P_b=P$, we get the following two equation with the two unknowns $u_a$ and $u_b$:

$$x_1 + u_a(x_2 - x_1) = x_3 + u_b(x_4 - x_3)$$
$$y_1 + u_a(y_2 - y_1) = y_3 + u_b(y_4 - y_3),$$

where $P_1=(x_1, y_1)$ and $P_2=(x_2, y_2)$ are the two points on line a, and $P_3=(x_3, y_3)$ and $P_4=(x_4, y_4)$ are the two points on line b. Solving these two equations yields the following expressions for $u_a$ and $u_b$:

$$u_a = \frac{(x_4 - x_3)(y_1 - y_3) - (y_4 - y_3)(x_1 - x_3)}{(y_4 - y_3)(x_2 - x_1) - (x_4 - x_3)(y_2 - y_1)}.$$
$$u_b = \frac{(x_x - x_1)(y_1 - y_3) - (y_2 - y_1)(x_1 - x_3)}{(y_4 - y_3)(x_2 - x_1) - (x_4 - x_3)(y_2 - y_1)}.$$

Note that the point of intersection, $P=\{x, y\}$, of the two lines can be expressed by equations $$x = x_1 + u_a(x_2 - x_1) \quad x = x_3 + u_b(x_4 - x_3)$$
$$y = y_1 + u_a(y_2 - y_1), \text{ or } y = y_3 + u_b(y_4 - y_3).$$

Thus, substituting either $u_a$ or $u_b$, into the above, we can find the point $P=\{x, y\}$.

In view of the above-described mathematical foundations, operation of the algorithm will now be described. Given that the position of the beacon is known relative to the signal receivers, the phase distance delta (receiver i) at a receiver i can be determined and then used together with the corresponding beacon_receiver_distance (receiver i) to construct the locus of the estimate of the client position. The intersection point of the lines, each of which interconnects the intersection points of a pair of intersecting loci, gives the location of the client. Note that certain assumptions must hold true. For example, the beacon emits continuously two pulses of distinct signature at a regular time interval that is greater than the time required to reach the farthest receiver. Further, the client emits continuously two pulse of distinct signature, also different from that of the beacon, at a regular time interval that is greater than the time required to traverse farthest distance between two receivers.

The following algorithm parameters have the meanings given as illustrated with a four-signal-receiver scenario. The beacon_receiver_distance (receiver i) is the known distance between the beacon and Signal Receiver i, $1 \leq i \leq 4$, where the distances are not necessarily the same for all receivers. The delta (receiver i) is the distance difference (or phase distance) in meters corresponding to the phase in seconds of beacon and client signals at Receiver i. It is equal to zero if they arrived at the same time. It is positive, if the client signals arrived later than the beacon signals. It is negative if the client signals arrived earlier than the beacon signals. The $r_i$ is the estimated distance of the client along the line connecting the beacon and Receiver i. The location (receiver i) is the location of Receiver i such as $\{x, y\}$. The $c_i$ is the circle around location (receiver i) of radius $r_i$. The $l_{ij}$ is the line formed by the intersection of $c_i$ and $c_j$, $i \neq j$.

The algorithm is executed in five steps as follows. In the first step, for each Receiver i, $1 \leq i \leq 4$, determine delta (receiver i), $r_i$=beacon_receiver_distance (receiver i)+delta (receiver i), and compute $c_i$ based on $r_i$ centered at location (receiver i). In the second step, for each pair of circles, $c_i$ and $c_j$, $i \neq j$, adjust the size of each circle by equal amounts until they intersect at two points if necessary as described below. In general, two pairs of circles are sufficient for the location system. Two circles, $C_0$ with center at $P_0=(x_0, y_0)$ and radius of $r_0$ and $C_1$ with center at $P_1=(x_1, y_1)$ and radius of $r_1$ intersect if $r_0+r_1 \geq r_{01} = \sqrt{(x_0-x_1)^2+(y_0-y_1)^2}$. Otherwise, the radius of each circle can be increased by a value greater than $$\Delta r = \frac{(r_{01} - (r_1 + r_0))}{2}$$

and less than $$\Delta r = \frac{(r_{01} - (r_1 + r_0)) + \min(r_0, r_1)}{2}$$

to cause them to intersect. In the third step, for each pair of intersecting circles, $c_i$ and $c_j$, $i \neq j$, resulting from the previous steps, determine the line, $l_{ij}$, passing the two points of intersection as described below. In general, two pairs of circles are sufficient. The two intersection points of two non-concentric circles are given by:

$$x_{31} = x_2 + h(y_1 - y_0)/d \quad x_{32} = x_2 - h(y_1 - y_0)/d$$
$$y_{31} = y_2 - h(x_1 - x_0)/d \text{ and } y_{32} = y_2 + h(x_1 - x_0)/d,$$

where $P_0=(x_0, y_0)$ is the center of one circle with radius $r_0$; $P_1=(x_1, y_1)$ is the center of the other circle with radius $r_1$; $P_2=\{x_2, y_2\}=P_0+a(P_1-P_0)/d$; $d^2=(x_1-x_0)^2+(y_1-y_0)^2$; $h=\sqrt{r_0^2-a^2}=\sqrt{(r_0+a)(r_0-a)}$; and $a=(r_0^2-r_1^2+d^2)/(2d)$. In the fourth step, for each pair of non-parallel lines, $l_{ij}$ and $l_{jk}$, $i \neq j \neq k$ determine the point of intersection as described below (In general, two non-parallel lines are sufficient). The intersection point of two non-parallel lines is given by:

$$x = x_1 + u_a(x_2 - x_1)$$
$$y = y_1 + u_a(y_2 - y_1),$$

where $$u_a = \frac{(x_4 - x_3)(y_1 - y_3) - (y_4 - y_3)(x_1 - x_3)}{(y_4 - y_3)(x_2 - x_1) - (x_4 - x_3)(y_2 - y_1)};$$

$(x_1, y_1)$ and $(x_2, y_2)$ are the two points of one line; and $(x_3, y_3)$ and $(x_4, y_4)$ are the two points of the other line. In the fifth step, the point of intersection determined above is reported as the position of the client.

Operation of the location system will now be described for specific examples. Because the beacon and the client each transmit their signals independently, these signals may start at the same time or one signal may lead the other. The operations of the location system under these conditions will be examined here. We will show that even if the transmission instances of the two signals are not synchronized, the location of the client can still be precisely determined.

Figure 12:
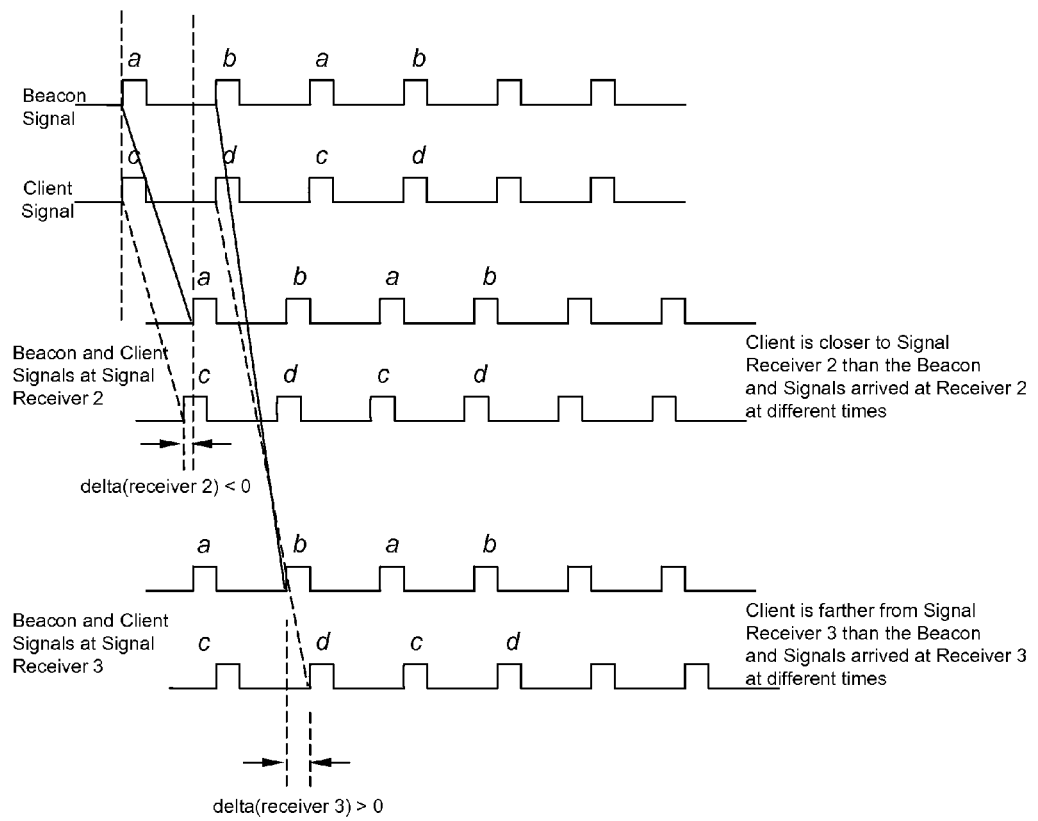
FIG. 12 illustrates a first case signal diagram, where both beacon and client signals are transmitted at the same time, i.e., the signals are in synch.
Figure 13:
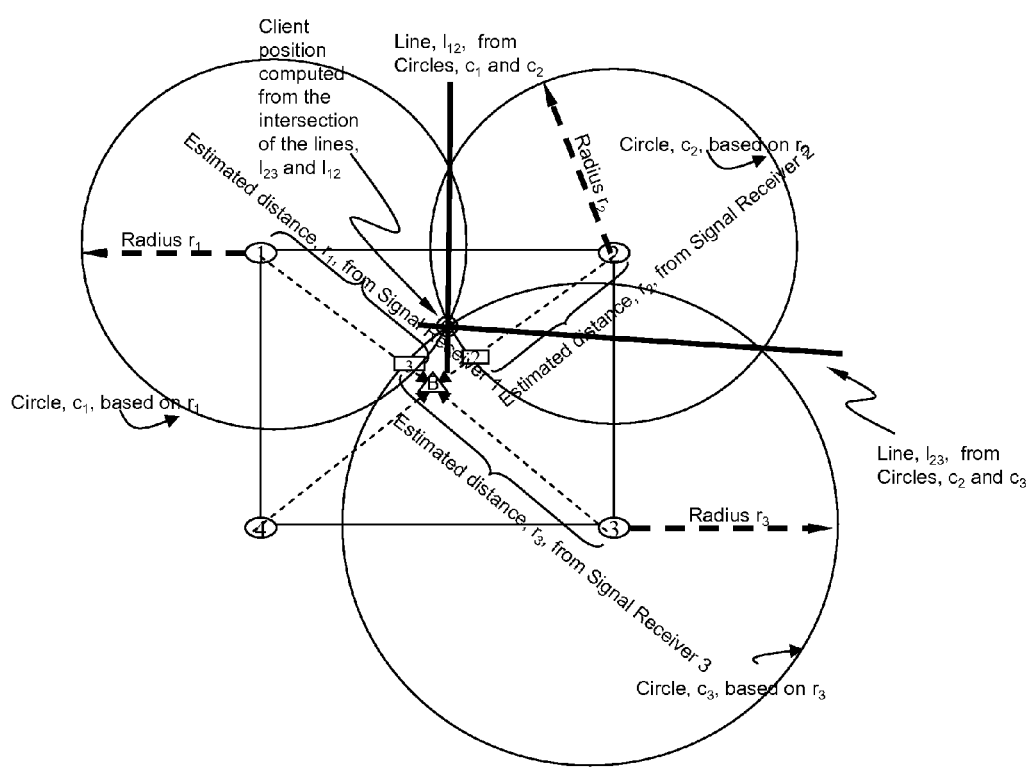
FIG. 13 illustrates the first case location diagram, where both beacon and client signals are transmitted at the same time, i.e., the signals are in synch.

FIG. 12 illustrates a case where both beacon and client signals are transmitted at the same time. In this case, the difference in arrival times of the beacon and the client signals at a signal receiver can be used directly to compute the exact distance of the client from the receiver. The exact distance of the client from a receiver is computed using the known distance from the beacon to the receiver and the measured difference in the times of arrivals. To determine the exact location of the client in the two dimensional space, we need the measurements of other receivers. From at least three such receiver measurements, we will be able to determine the location of the client as shown in FIG. 13. More specifically, the algorithm steps are as described below.

The first step is to determine the perceived distance of the client from each signal receiver along each segment formed by the beacon and the receivers. This distance can be estimated based on the difference in the time arrival of the beacon pulse and the client pulse at each receiver as measured by the TDOA apparatus shown in FIG. 4. The arrival time of the client pulse d with respect to the beacon pulse b at each receiver indicates the relative distance of the client with respect to the beacon. Only the distance of the beacon from each receiver is known. In the second step the perceived distance of the client from each receiver forms a circle (locus) centered at the receiver. In the third step a line can be constructed joining the intersecting points for each pair of intersecting circles. In the fourth step the intersection of these lines is also the location of the client as shown in FIG. 13. Although, the common intersection of all the circles is a more simple solution here, we will see in the following discussion that it may not provide a sufficiently general solution.

Figure 14:
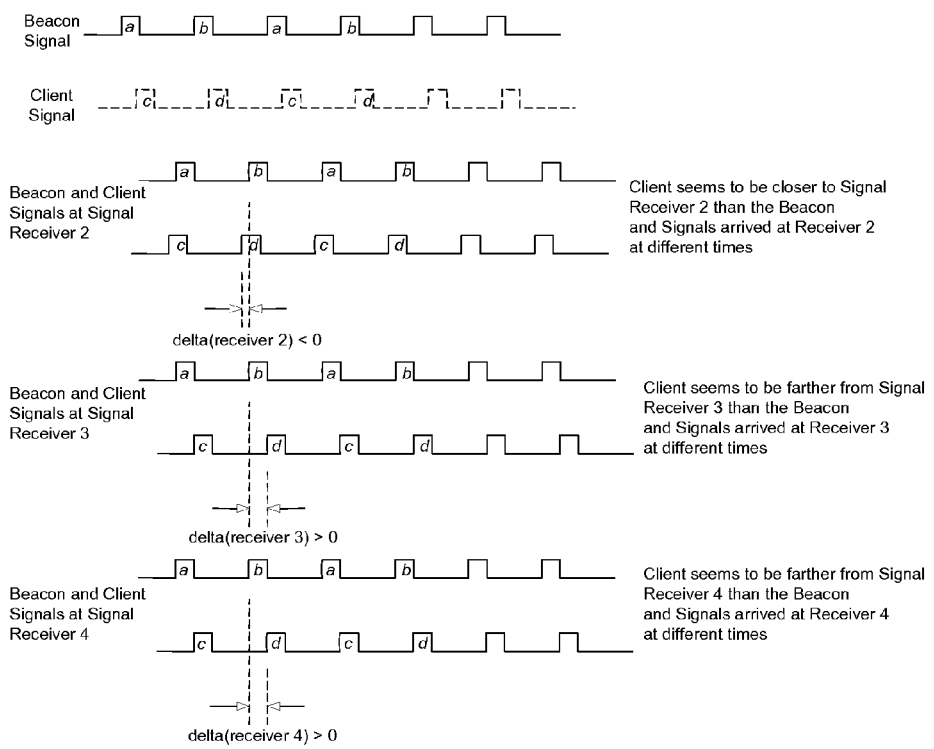
FIG. 14 illustrates a second case signal diagram where the beacon signal is transmitted before, i.e., ahead of, the client signal.
Figure 15:
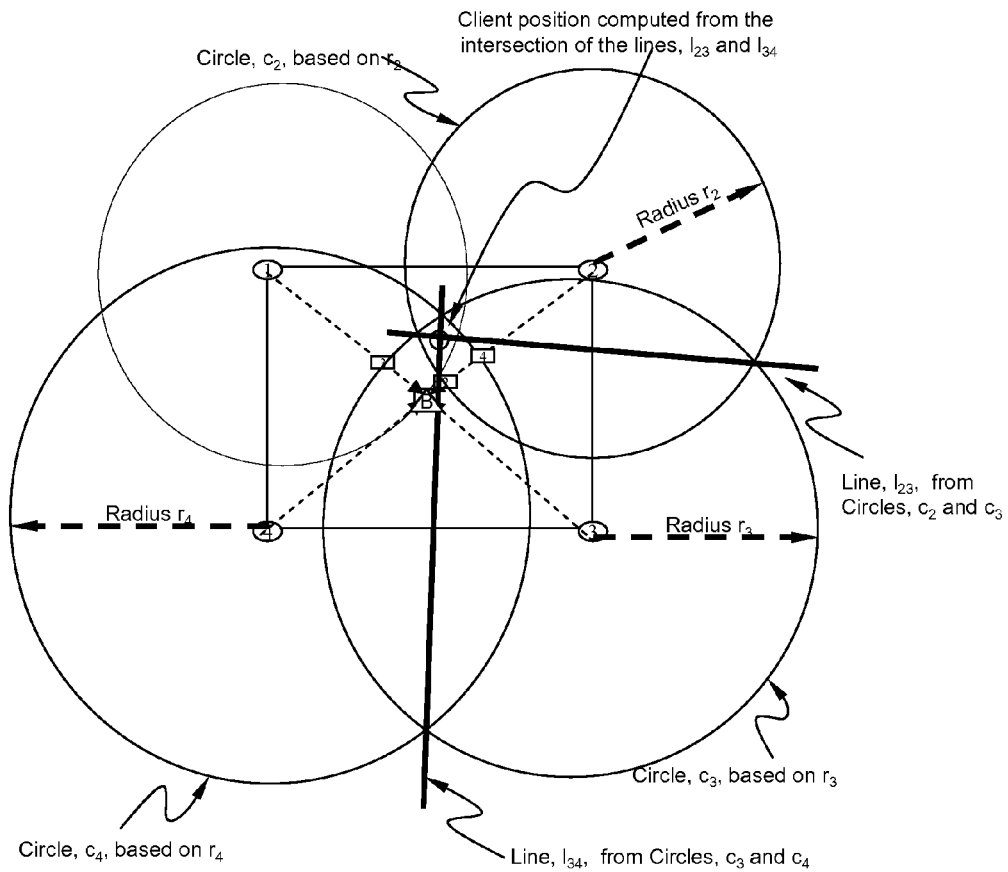
FIG. 15 illustrates the second case location diagram, where the beacon signal is transmitted before, i.e., ahead of, the client signal.

FIG. 14 illustrates a case where the beacon signal is transmitted before the client signal. When the signals from the beacon and client are not emitted synchronously, then the beacon could be sending its signal either ahead of the client or after that of the client. In either case, the location technique described above will still compute the valid location value. The position of the client will now appear to be further than its actual location from a given receiver as shown by the circle in FIG. 15. This circle does not indicate accurately how far the client is from the receiver 2. As illustrated in FIG. 15, receiver 3 provides similar inaccurate information. Hence, the intersections of the two circles do not contain the client location. However, the line through the intersection points of the two circles does contain the client location. Consequently, two such lines obtained from two different pairs of circles will intersect at the client location.

Figure 16:
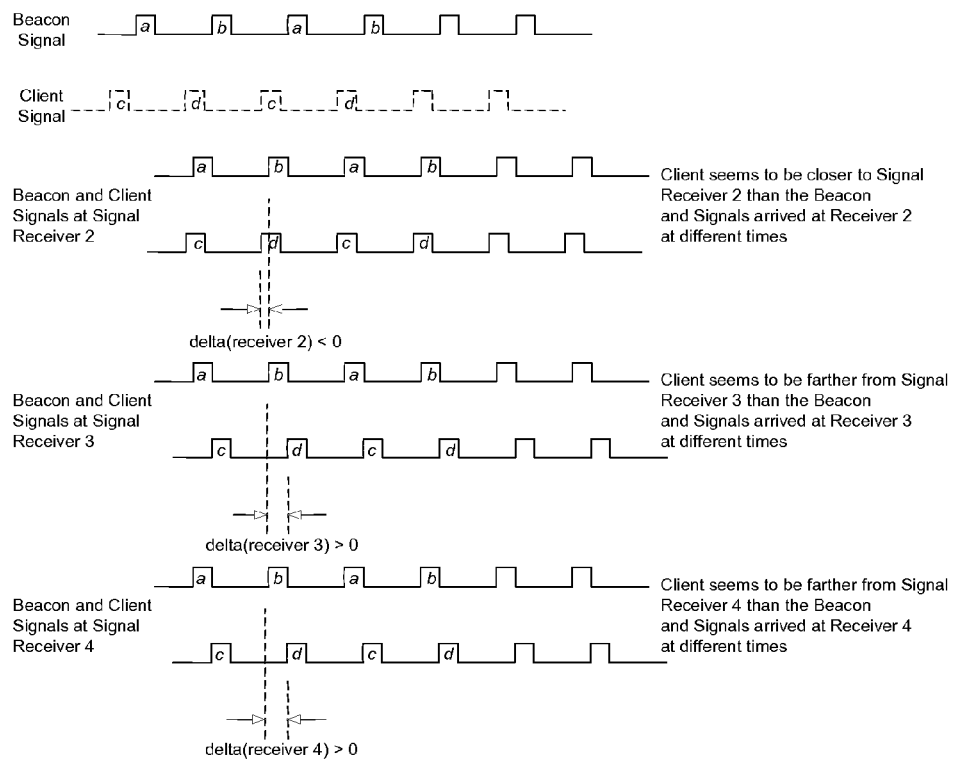
FIG. 16 illustrates a third case signal diagram, where the beacon signal is transmitted after, i.e., behind, the client signal.
Figure 17:
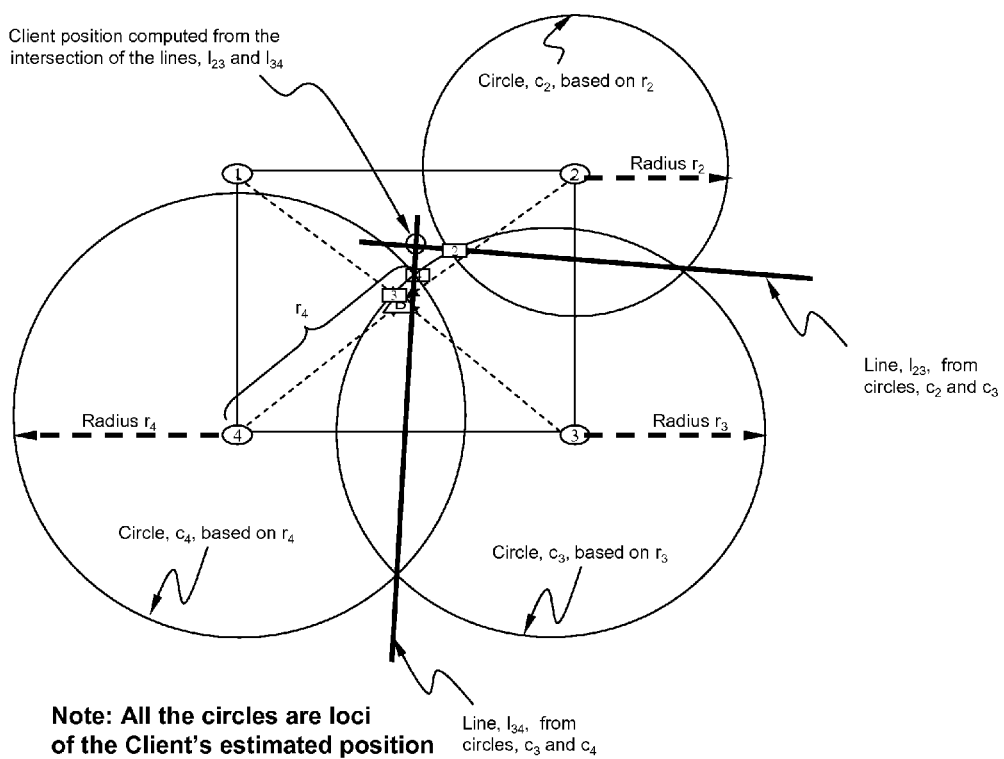
FIG. 17 illustrates the third case location diagram, where the beacon signal is transmitted after, i.e., behind, the client signal.

FIG. 16 illustrates a case where the beacon signal is transmitted after the client signal. When the client send its signal ahead of the beacon, the distance from client to the receiver in reference to the beacon's signal appears to be closer to the receiver as shown by the circles in FIG. 17. In this case, there could be circles that do not intersect. The signal emission interval of the beacon and the clients can be defined to ensure a sufficient number of intersecting circles. In this example, it is still possible to find the actual location of the client using the same technique used in the previous sections. With a closer inter-transmission interval of beacon signal, the above situation can be adequately mitigated. Note that it is also possible to artificially enlarge each pair of circles by the same amount until they intersect to produce a line to mitigate the above non-intersecting dotted circles (see Step 2 of the location algorithm described above).

In view of the above, it will be appreciate that, irrespective of synchronized emission times of client and beacon pulses, the arrival times of client and beacon pulses at each receiver provides all the receivers with consistent knowledge of the relative position of the client with respect to the beacon. The intersection points of the loci of the position estimate always gives the location of the client. It can also be observed from the accuracy analysis that the location system provides accurate location resolution even if the signal receivers are run asynchronously, as long as their parts-per-million (ppm) frequency accuracies are within the order of a few tens of ppm around a common nominal value.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for calculating location of a client device in a network, comprising:
   receiving, by at least three non-collinear receivers, a beacon signal from a beacon device at a known location;
   receiving, by the non-collinear receivers, a client signal;
   calculating a time difference of arrival between the beacon signal and the client signal;
   for each of the receivers, utilizing the time difference to calculate a perceived distance to the client based at least in part on the receiver known position with respect to the beacon device;
   calculating, for each receiver, a circle centered on the receiver and having a radius equal to the perceived distance;
   calculating at least two lines defined by points of intersection of the calculated circles, one such pair for each line;
   calculating the point of intersection of the lines, the point of intersection representing the location of the client; and
   signaling the calculated client location.

2. The method of claim 1 including the further step of coding the beacon signal so that the beacon signal is distinguished from the client signal.

3. The method of claim 2 wherein coding the beacon signal includes generating two pulses at a regular interval such that the interval is greater than the largest propagation time between the receivers.

4. The method of claim 1 including the further step of scaling the circles to create points of intersection.

5. The method of claim 4 including the further step of calculating client location in three-dimensional space.

6. The method of claim 1 wherein the signal receivers are arranged on vertices which define a convex polygon as viewed from above.

7. The method of claim 1 including the further step of signaling the calculated client location to an application.

8. Apparatus for client device location calculation in a network, comprising:
   at least one beacon device operable to generate a beacon signal, the beacon device disposed at a known location;
   at least three non-collinear receivers, the receivers operable to receive the beacon signal and a client signal; and
   a device operable in response to a time difference of arrival between the beacon signal and the client signal for each of the receivers to utilize the time difference of arrival to calculate based at least in part on the receiver known position with respect to the beacon device:
   a perceived distance to the client;
   for each receiver, a circle centered on the receiver and having a radius equal to the perceived distance;
   at least two lines defined by points of intersection of the calculated circles, one such pair for each line; and
   the point of intersection of the lines, the point of intersection representing the location of the client;
   the device being further operable to signal the calculated client location.

9. The apparatus of claim 8 wherein the beacon is operable to code the beacon signal so that the beacon signal is distinguishable from the client signal.

10. The apparatus of claim 9 wherein the beacon device is further operable to generate two pulses at a regular interval such that the interval is greater than the largest propagation time between the receivers.

11. The apparatus of claim 8 wherein the device is further operable to scale the circles to create points of intersection.

12. The apparatus of claim 11 wherein the device is further operable to calculate client location in three-dimensional space.

13. The apparatus of claim 8 wherein the signal receivers are arranged on vertices which define a convex polygon as viewed from above.

14. The apparatus of claim 8 wherein the device is operable to signal the calculated client location to an application.

* * * * *